Aug. 16, 1949.  H. J. KERR ET AL  2,479,240
FUEL BURNING APPARATUS
Original Filed March 7, 1941  6 Sheets-Sheet 1
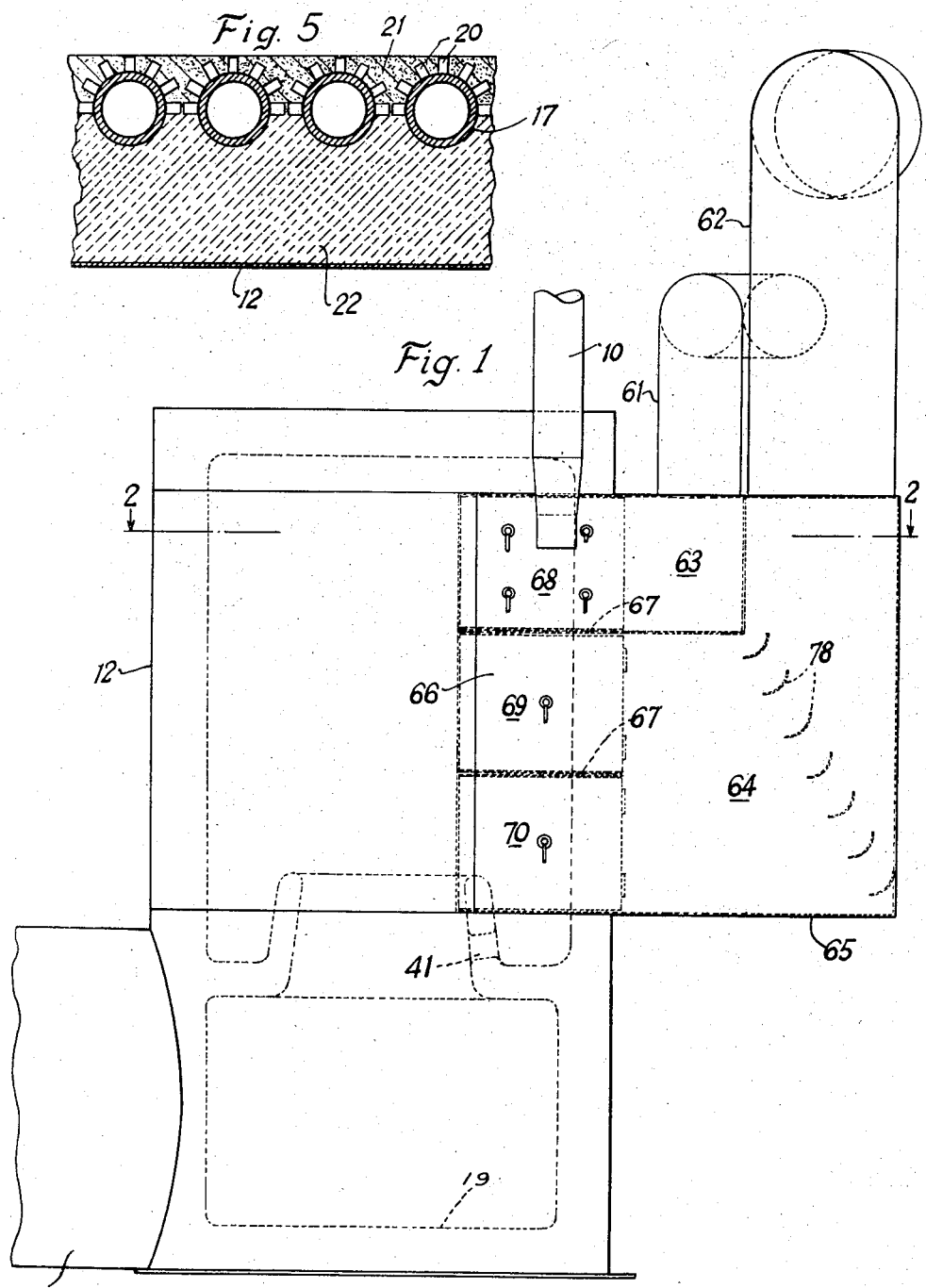
INVENTORS
Howard J. Kerr, James Fletcher
BY George A. Watts & Lambert Kooistra
Attorney Aug. 16, 1949.  H. J. KERR ET AL  2,479,240
FUEL BURNING APPARATUS
Original Filed March 7, 1941  6 Sheets-Sheet 2
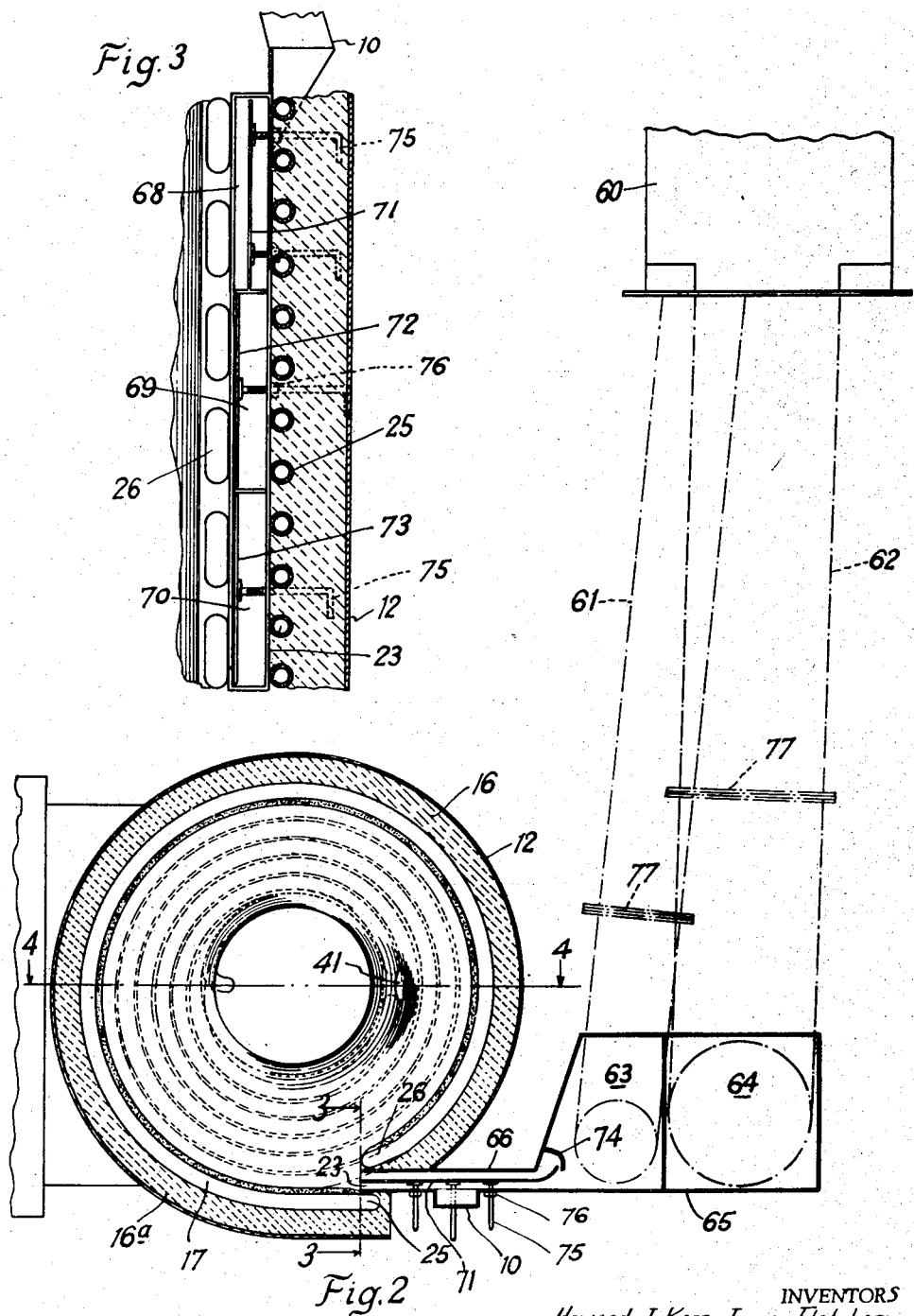

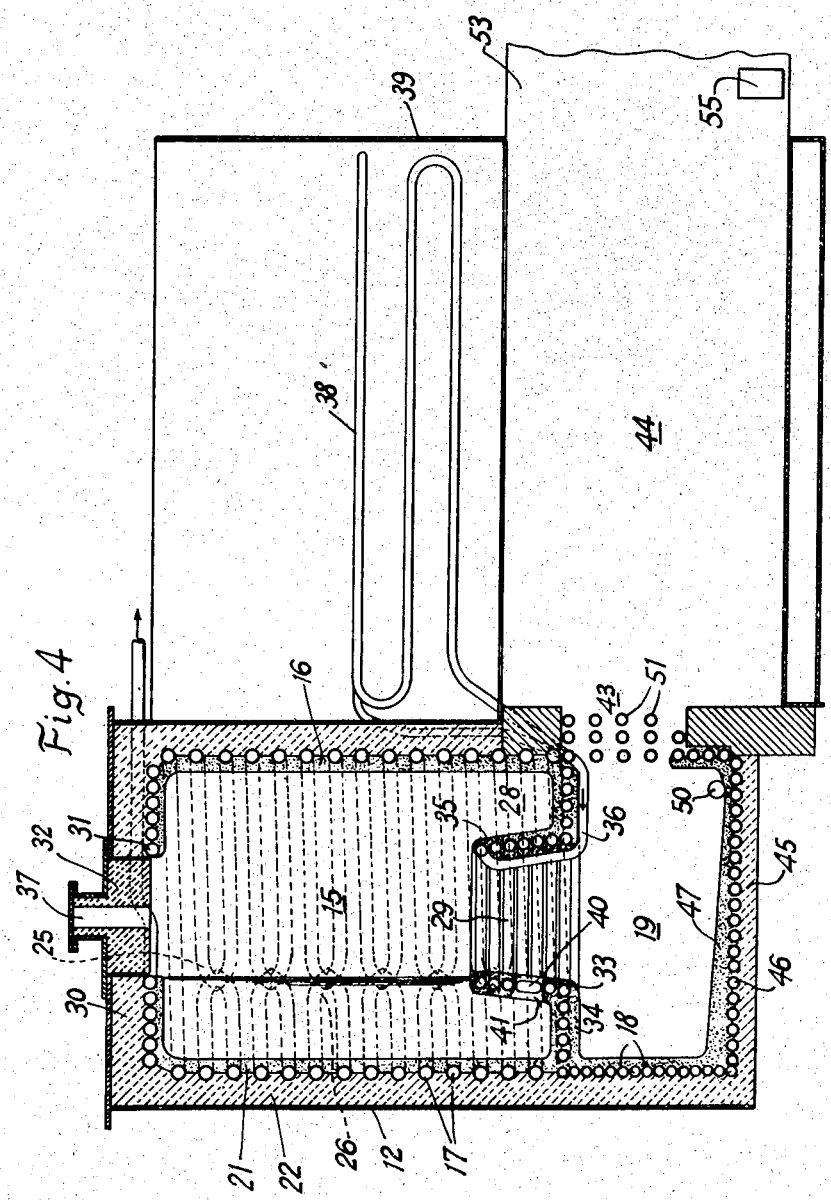

Aug. 16, 1949.        H. J. KERR ET AL        2,479,240
FUEL BURNING APPARATUS
Original Filed March 7, 1941                6 Sheets-Sheet 4
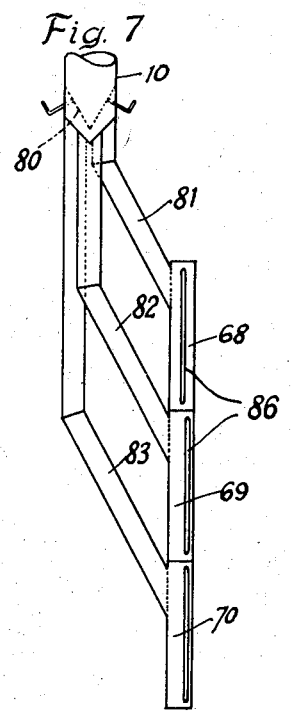
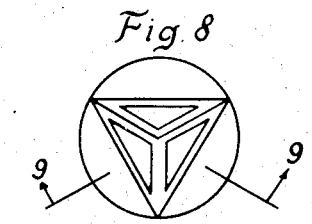
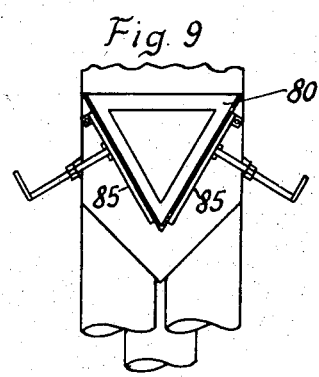
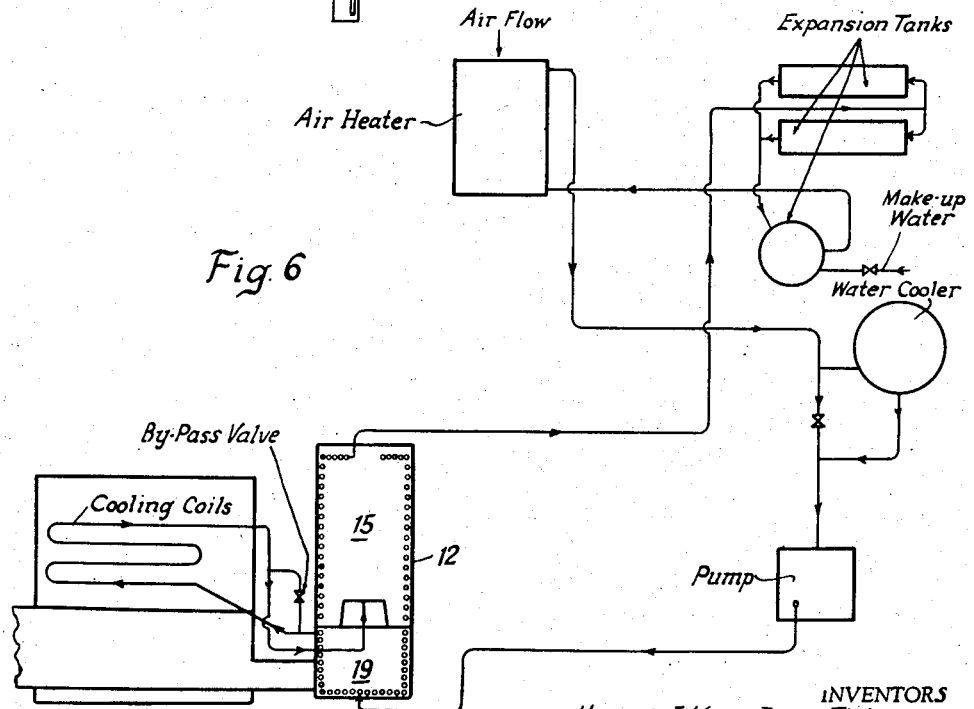
INVENTORS
Howard J. Kerr, James Fletcher,
BY George A. Watts & Lambert Kooistra
Attorney

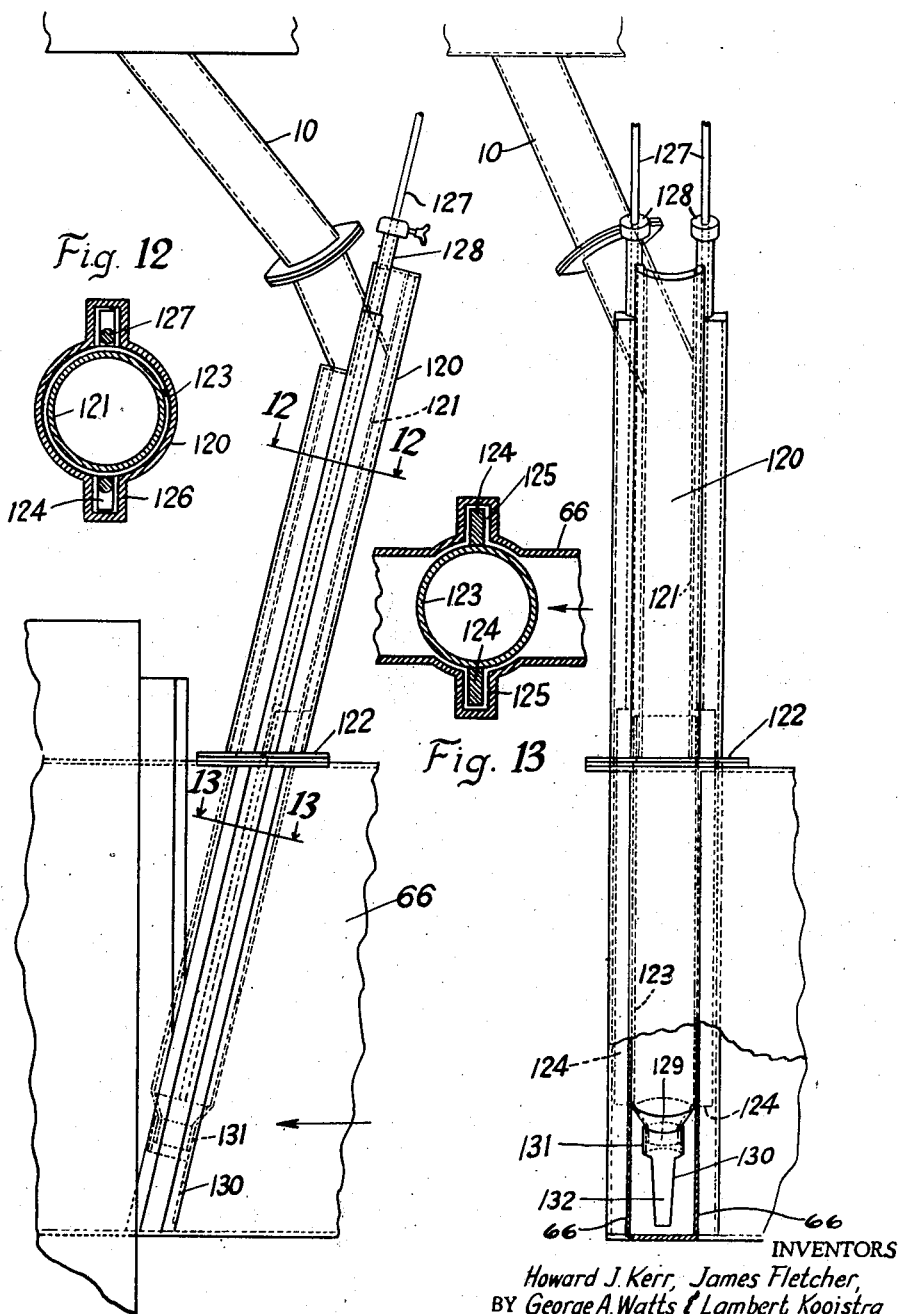

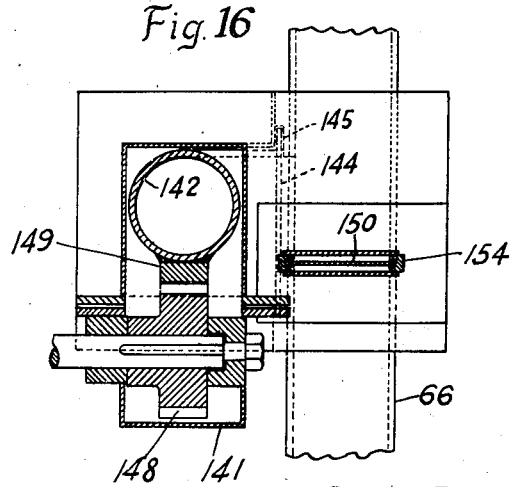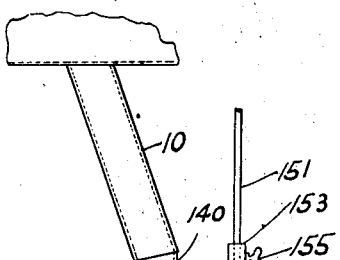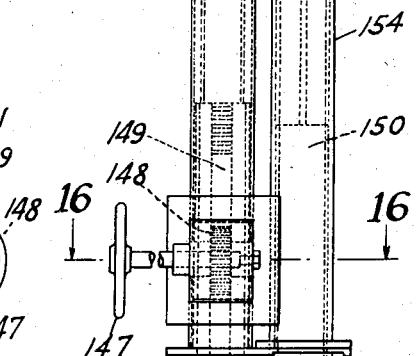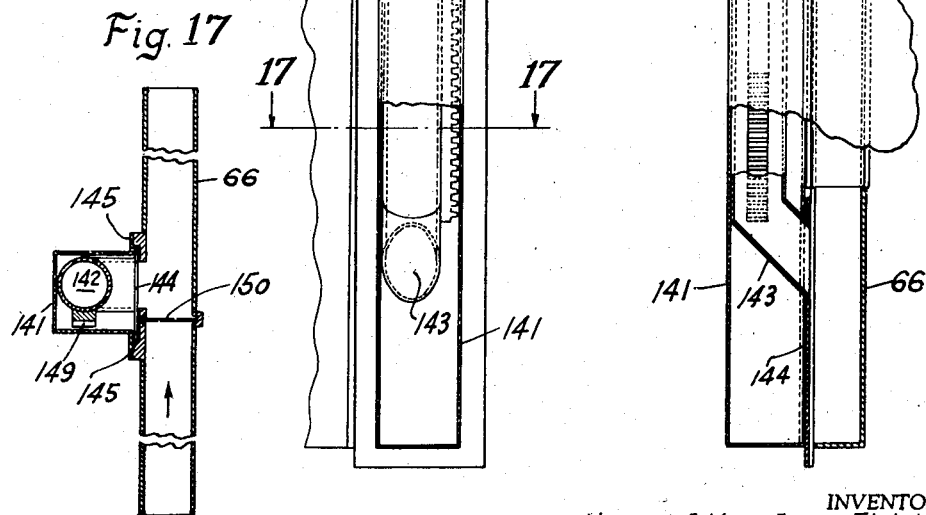

Patented Aug. 16, 1949

2,479,240

UNITED STATES PATENT OFFICE 2,479,240

FUEL BURNING APPARATUS

Howard J. Kerr, Westfield, N. J., and James Fletcher, Akron, George A. Watts, Barberton, and Lambert Kooistra, Akron, Ohio, assignors to The Babcock & Wilcox Company, Rockleigh, N. J., a corporation of New Jersey Original application March 7, 1941, Serial No. 382,264. Divided and this application July 20, 1944, Serial No. 545,776. In Canada February 13, 1941

13 Claims. (Cl. 110—28)

The present invention relates in general to apparatus for burning ash-containing solid fuels, and more specifically, for burning bituminous and semi-bituminous coals in a relatively coarsely pulverized or crushed condition in a furnace of the cyclone type.

The general object of our invention is the provision of an improved apparatus for supplying fuel of the character described and combustion air to a furnace, and more particularly to a vertically arranged furnace of the cyclone type in which the fuel is burned at very high rates of heat release and with a discharge of the gaseous products of combustion from the bottom of the furnace and a recovery of substantially all of the recoverable ash content of the fuel in a molten condition.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which are illustrated and described several embodiments of the invention.

Of the drawings:

Fig. 1 is an elevation of a portion of a test cyclone furnace installation constructed and operable in accordance with this invention; Fig. 2 is a horizontal section taken on the line 2—2 of Fig. 1; Fig. 3 is an enlarged vertical section taken on the line 3—3 of Fig. 2 showing the furnace fuel and air ports; Fig. 4 is a sectional elevation taken on the line 4—4 of Fig. 2; Fig. 5 is an enlarged view of a portion of the furnace wall construction shown in Fig. 4; Fig. 6 is a flow diagram of the steam generating system of the installation shown in Figs. 1-5; Fig. 7 is an elevation of a modified fuel feeding arrangement; Fig. 8 is a plan view of the fuel distributor of Fig. 7; Fig. 9 is a vertical section taken on the line 9—9 of Fig. 8; Fig. 10 is an elevation partly in section of a modified form of fuel and air supply provisions; Fig. 11 is an end view partly in section of the construction shown in Fig. 10 looking toward the furnace in Fig. 1 from the right; Figs. 12 and 13 are horizontal sections taken on the lines 12—12 and 13—13 of Fig. 10; Fig. 14 is an elevation partly in section similar to Fig. 11 of another form of fuel and air supply provisions; Fig. 15 is a side view, partly in section, of the apparatus shown in Fig. 14; Fig. 16 is an enlarged horizontal section taken on the line 16—16 of Fig. 14; and Fig. 17 is a horizontal section taken on the line 17—17 of Fig. 15.

While various kinds of liquid, gaseous and solid fuels can be burned in the apparatus illustrated, the apparatus hereinafter described is especially designed and particularly adapted for supplying and burning bituminous and semi-bituminous coals having an ash fusion temperature below 2800° F. and reduced by crushing or pulverization to an aggregate or mixture of particle sizes not over ½". Solid fuel of this general character has been referred to as "granular" or "granulated" fuel. The fines in the mixture passing through a 200 mesh screen may be between 3% and 20%, depending upon the volatile content of the coal. The minimum volatile content of the coal may vary considerably, ranging, for example, from 20% for a coal having an ash fusion temperature of 2350° F. to 40% for a coal with an ash fusion temperature of 2700° F. A certain percentage of fines in the mixture is desirable to aid ignition and promote combustion of the entering fuel, but an excessive amount is undesirable as the amount of ash leaving the furnace as fly ash is proportional. The larger the size of the coal particles, the less the amount of fly ash, but the higher the percentage of coarse particles, the higher the air velocity required to keep the particles in motion in the furnace until they are deposited on the slag-covered furnace walls. A consideration of all of the factors involved makes a relatively coarse fuel mixture most desirable. For example, a desirable mixture for bituminous coals having about 11% moisture, 16% ash, 39% volatiles, and a heat value of 10,300 B. t. u. per pound as fired, would be 98-100% through a 4-mesh screen, 40-50% through 30 mesh, 10-18% through 100-mesh, and 6-10% through a 200-mesh screen. Coal of the character described is supplied at a regulable rate from a feeder (not shown) connecting a bin or crusher to a supply pipe 10, the lower end of which opens into one side of a primary air passage where the entering fuel particles are swept up by a high velocity stream of preheated air and delivered to the furnace.

The cyclone furnace consists of an elongated substantially cylindrical casing 12 arranged with its axis vertical. The casing encloses refractory faced fluid cooled walls defining a vertically elongated main or primary furnace chamber 15 of approximately circular horizontal cross-section. The furnace walls include a circumferential wall 16 defined by a water tube coil 17. A coil 18 defines the circumferential wall of a subjacent secondary furnace chamber 19. The inner half of the tube portions in the boundary walls of the two furnace chambers have metallic studs 20 welded thereon, as shown in Fig. 5, and covered by a layer of suitable high temperature refractory 21, such as plastic chrome ore. A layer of heat insulation 22 is placed between each tube coil and the casing 12.

The inner exposed surface of the circumferential wall of the main furnace chamber is made to conform as much as possible to a uniform circular cross-section throughout its height to avoid interference with the desired helical flow path of the fuel and air and products of combustion downwardly through this chamber. The main deviation from the desirable uniform circular cross-section is due to the necessary openings for the entry of fuel and air to this chamber and the construction of the circumferential wall portions adjacent the points of fuel and air entry so as to insure movement of the entering fuel and air in the desired flow path, minimize interference with the streams already in the furnace, and to avoid solidified slag and coke formations on the furnace chamber walls, particularly around the points of fuel and air entry. As illustrated in Figs. 1, 3 and 4, all of the fuel and air is preferably introduced into the furnace chamber through a plurality of vertically elongated ports in vertical alignment and extending over a major portion of the furnace chamber height. The inlet ports are part of a vertically elongated slot 23 arranged tangentially to the outer end of a section 16ª of the circumferential wall shaped in the form of an involute curve and extending about one-half the circumference of the furnace chamber. The slot is defined by connecting vertically adjacent portions of the tube coil into two radially spaced overlapping groups of 180° bends 25 and 26, the bends 25 being at the outer end of the involute curved wall section 16ª. The upper end of the slot 23 terminates slightly below the upper end of the furnace chamber.

The top of the furnace chamber 15 is closed by a roof 30 formed by a flat studded tube coil 31 covered on its lower side by refractory material 21. A central opening in the roof 30 is closed by an access door 32 having an inspection opening 37. The bottom of the main furnace chamber 15 is fluid cooled by a coiled tube 33 defining a flat annular outer bottom section 34 and an upwardly converging inner throat section 35, the upper and lower sides of the flat tube portions and the outer and inner side of the throat tube portions being studded and covered with plastic refractory as heretofore described. An annular pocket 28 open at its upper side only is thus formed around the downwardly flaring gas outlet 29 defined by the throat 35. The coil 33 is serially connected to the tube coil 17 and through a bare tube portion 36 to an intermediate cooling coil 38 arranged in a water tank 39.

An intermediate pair of adjacent tube portions in the throat are formed with a pair of angularly spaced 180° bends 40 to define therebetween a slag discharge opening 41 slightly above the floor level of the pocket and at the side of the throat remote from the secondary furnace gas outlet. The slag outlet is angularly spaced from the fuel and air inlet slot 23, and, as shown in Fig. 2, is preferably located approximately 90° rearwardly of the slot 23 relative to the direction of rotation of the streams in the main furnace chamber. With this arrangement any slag in a fluid condition on the furnace chamber floor will flow towards the slag discharge opening and drop therethrough into the secondary furnace chamber 19.

The secondary furnace chamber 19 opens through a gas outlet opening 43 to a tunnel 44 in the water tank 39. The chamber 19 has its bottom 45 fluid cooled by a flat coil 46 connected to the bottom of the coil 18. A feed water pump or other means for establishing a circulation is connected to the coil 46. The coil 46 is studded and covered with a layer of refractory insulation 47 sloping downwardly toward the gas outlet 43. A slag discharge opening 50 is formed at the bottom of the chamber 19 below the level of the gas outlet 43. The portions of the tube coil 18 extending across the gas outlet are arranged to form a slag screen 51. The heating gases flowing through the tunnel 44 are discharged through a stack connection 53. A slag outlet 55 is located in the bottom of the stack connection for the removal of any slag swept into the tunnel 44 from the chamber 19. The water circulating system of the experimental unit is diagrammatically shown in Fig. 6.

The fuel and air supply provisions comprise a combination hot gas mixing and water heated air heater 60 having means for discharging two streams of hot air, heated to different temperatures if desired, through a primary air duct 61 and a secondary air duct 62. The ducts 61 and 62 are connected to compartments 63 and 64 respectively, of an air casing 65 mounted on the cyclone furnace. The casing 65 has a laterally extending nozzle section 66, the discharge end of which terminates in the furnace slot 23. The nozzle section 66 is of relatively narrow width throughout its length, corresponding to the width of the slot 23 and is divided into three similar vertically elongated horizontally directed ports 68, 69 and 70 by horizontal diaphragms 67. The remaining portion of the casing is constructed so that the compartment 63 opens only into the port 68 and the compartment 64 only into the ports 69 and 70. Each of the nozzle ports is provided with an adjustable damper, the damper 71 in the port 68 having a curved outer end and being variable from a wide open position to a half closed position, as shown in Fig. 3, by threaded rods 75 passing through nuts 76 welded on the side of the casing, the inner end of each rod having a loose connection with the corresponding damper to permit the rod to turn. A stationary curved baffle 74 cooperates with the curved outer end of the damper 71 to prevent by-passing of the port area controlled by the damper. The dampers 72 and 73 in the secondary air ports 69 and 70 respectively are flat and hinged at their outer ends so that they are variable over the full width of the corresponding port without changing the position of the air streams relative to the involute curved circumferential wall section. The dampers 72 and 73 are adjusted by a single control rod 75, while the damper 71 is controlled by two pairs of vertically spaced control rods to permit a uniform lateral adjustment of this damper and thus provide a uniform effective flow area throughout the length of the port 68. The secondary air compartment 64 has an inclined group of curved directing vanes 78 positioned therein, as shown in Fig. 1, to provide a uniform flow of secondary air throughout the height of the ports 69 and 70. As shown in Figs. 1 and 3, the fuel supply pipe 10 is connected to the top port 68 through a rectangular opening in the upper part of one side thereof to supply a controlled amount of fuel to the high velocity stream of preheated air passing through the port. Orifice plates 77 are positioned in the air supply ducts 61 and 62 to facilitate the measurement and control of the air supplies.

The cyclone furnace construction described permits the efficient burning of fuel of the character described at very high rates of heat release with only a small percentage of excess air over a wide range of ratings and separation and removal of a high percentage of the ash content of the fuel in a molten condition before the gaseous products of combustion leave the furnace. In operation the furnace is initially preheated by an oil or gas burner temporarily inserted therein. The fuel and air supplies are then controlled to provide a mixture of the fuel particles and primary air which is discharged at a high velocity through the port 68, and a supply of high velocity secondary air through one or both of the secondary air ports 69 and 70. The total air supply is directly proportional to the amount of fuel supplied to the furnace, the fuel-air ratio maintained being such that the total air supply is not more than about 20%, and preferably less than 15%, in excess of the theoretical combustion air requirements. The air-fuel ratio may be varied to some extent as a lower excess air ratio is usually desirable at the higher fuel rates to increase the adiabatic furnace temperature and facilitate slag tapping. About one-third of the air supply is delivered to the primary air port. Due to the admission of the fuel from the pipe 10 into the upper part of the port 68 and the high velocity of the air passing through that port, the discharge therefrom into the furnace will usually consist of an intimate mixture of fuel and air from the upper part of the port and substantially clean combustion air from the lower part.

The entering vertically elongated stream of primary air and fuel is directed horizontally along the involute curved section of the circumferential wall of the furnace chamber and as it moves therealong is exposed to the high temperature conditions present in the furnace chamber. The fines in the fuel mixture are ignited almost immediately on entrance and the combustion of the fines aids the ignition and combustion of the larger fuel particles as the stream whirls around the upper end of the furnace chamber in a film along the circumferential wall. Due to the location of the discharge throat, gravity, and the continuous tangential entry of primary air and fuel, the stream of burning fuel particles, air and products of combustion will follow a helical path downwardly along the circumferential wall. The rapid combustion of the fuel particles results in an early release of the ash content thereof, and due to the centrifugal effect thereon, the ash released is deposited on the furnace walls, and particularly the circumferential wall, resulting in the formation of a thin layer or film of molten ash or slag, which adheres to the refractory surface of the walls and quickly provides a sticky surface to which fuel particles, particularly the larger fuel particles, in the whirling fuel and air stream, will adhere and be completely burned thereon. The rate of combustion of the fuel particles held on the furnace walls is substantially increased by the scrubbing action of the contacting air. The use of preheated primary air is particularly desirable to facilitate the ignition of the entering fuel. With the cyclone furnace constructed and arranged as described it is deemed essential for efficient operation that the primary air-fuel stream should always enter the furnace chamber at a point above the level of the secondary air admission ports.

The secondary air enters the furnace through the ports 69 and 70 in the same angular direction and at a high velocity of the same order as that of the whirling stream of primary air and fuel. The secondary air stream intimately mixes with the stream of burning fuel, air, and products of combustion and passes downwardly therewith in the helical path of flow. Combustion of the remaining fuel particles in suspension approaches completion as the whirling stream reaches the bottom of the furnace chamber 15. At this point and due to the location and configuration of the throat 35, the whirling stream is forced to move inwardly and upwardly to reach the gas outlet through the throat. This relatively abrupt axial reversal in direction of movement of the stream results in ash or slag particles in suspension being thrown out of the whirling stream and deposited on the furnace bottom around the throat. Any incompletely burned fuel particles will separate out of the gas stream in this flow reversing zone due to the gravity and inertia effects thereon and will remain in the annular pocket 28, either partly embedded in the slag surface therein or moved around in the pocket by the whirling gases therein, until all of the combustible content is consumed and the ash content released. The location of the slag outlet 41 in the throat above the bottom of the pocket insures a slag layer therein under all operating conditions. The slag coating on the furnace walls rapidly reaches an equilibrium thickness, which is dependent upon the relative values of the furnace wall temperature, the ash fusion temperature, the mean furnace chamber temperature, and the velocity of the contacting gas stream. The deposition of additional slag results in a flow of slag down the furnace walls to the furnace chamber floor. The molten slag accumulating on the furnace floor overflows through the slag discharge opening 41 into the secondary furnace chamber 19, where it flows down to the floor thereof to the slag outlet 50. The furnace gases flow downwardly through the gas outlet 29 into the secondary furnace chamber, turn therein and flow through the outlet 43 and tunnel 44 to the stack connection 53.

The relative arrangement of the primary air-fuel and secondary air ports described is particularly advantageous in minimizing slag formations on the circumferential wall at points where they would interfere with the entry of either the fuel or air. Slag depositing in any nozzle port would cause an increase in the flow resistance therein and correspondingly reduce the fuel or air supply therethrough. Such accumulations would also tend to disrupt the air and fuel flow path in the furnace and to destroy the desired whirling of the stream along the furnace chamber circumferential wall. With the air and fuel stream entering the furnace chamber tangentially to an involute curved wall section extending a substantial distance, the entering streams have an opportunity to gradually merge with the whirling furnace gases before intimate contact with the descending slag. Only the secondary air ports are in a position wherein there is any tendency for slag formations to form adjacent the point of entry. Any such formations can be quickly removed without shutting down the furnace by momentarily reducing or shutting off the secondary air supply through the nozzle port affected, and supplying all the secondary air through the other nozzle port. With this operation any slag accumulations at or adjacent the level of the closed port will be quickly melted and thus eliminated. The relative position of the refractory faced roof of the furnace chamber 15 and the fuel inlet port insures a high furnace temperature in the fuel entrance zone of the furnace chamber and thereby the absence of coke formations in this area, and particularly at the trailing edge of the fuel port.

By way of example, and not of limitation, one test run of the experimental installation illustrated in Figs. 1–6, gave the following values which indicate representative conditions to be maintained in accordance with the present invention. The fuel burned was Ohio No. 8 coal reduced to the following sizing:

85.9% through No. 4 mesh
53.4% through No. 10 mesh
24.1% through No. 30 mesh
16.8% through No. 50 mesh
10.8% through No. 100 mesh
6.7% through No. 200 mesh A proximate analysis of the coal showed

|  | Per cent |
|---|---|
| Moisture | 3.3 |
| Volatile matter | 38.2 |
| Fixed carbon | 49.2 |
| Ash | 12.4 |
| Sulphur | 3.7 |

Heat value—dry 13,020 B. t. u./lb.

The ash as analyzed showed an initial deformation temperature of 2120° F., a softening temperature of 2210° F., and a fluid temperature of 2430° F. The coal was fired at a rate of 2280 lbs. per hr. with an excess air of 19.5%. The total air supplied was 25,700 lbs. per hr., of which 26.85% was supplied as primary air, and 73.15% as secondary air through both of the secondary air ports. The air velocity through the primary air port was 21,000 ft. per minute and through the secondary air ports 22,000 ft. per minute. The average velocity of the gases passing out through the throat 35 was calculated as 30,350 ft. per minute. The air was supplied at a temperature of 390° F., and the furnace temperature was approximately 3200° F. The heat release was 1,087,000 B. t. u. per cu. ft. of furnace volume. About 93% of the recoverable ash content of the fuel was removed as molten slag and found to be practically free of combustible matter.

Good operating conditions may be defined as those resulting in 16% to 17% $CO_2$ with no coke or slag formations around the furnace chamber inlets, a continuous flow of slag through the slag opening 41 and steady flame conditions in the furnace chamber.

With the construction illustrated in Figs. 1–6 operating as described, the length of the helical path of travel of the fuel and air downwardly through the furnace chamber will be substantially the same at all ratings and be approximately the maximum length attainable in such a furnace. It has been found that improved operating conditions over a wide range of ratings can be obtained if the point of fuel entry, and thereby the length of travel in the furnace chamber before reaching the gas outlet, is varied with the rating, and particularly by lowering the point of fuel entry as the rate of fuel firing decreases. For the best results with such operation, substantially all of the secondary air supplied should be admitted below the level of the fuel entry point.

In Figs. 7–9 a modified arrangement of fuel supply means is illustrated in which fuel can be supplied to any one or combination of ports. In the modified construction a three-way distributor 80 in the fuel supply pipe 10 permits the fuel to be divided between three separate pipes 81, 82, and 83 leading into the sides of the nozzle ports 68, 69, and 70 respectively. The coal supply to the individual ducts is separately controllable by individual hinged valves 85, as illustrated in Fig. 9, whereby coal may be fed to any one of the three ports alone or in combination with one or both of the remaining ports. The effective width of each port is controllable by a hinged flat damper 86 similar to the dampers 72, 73 shown in Figs. 2 and 3, and capable of independent adjustment to close off the air supply through any port. Good operation has been attained at the higher fuel ratings with fuel and air passed through all of the ports, or only the top port with air alone through the middle and bottom ports; at intermediate ratings with fuel and air discharged through the top and middle ports 68 and 69, or the middle port alone, and secondary air through the bottom port 70, and at low ratings with all of the fuel and air through the bottom port 70 and the top and middle ports closed off. It is highly desirable in any case where fuel is supplied through only the middle or bottom ports that no air be supplied through any higher port. In one test run in which all of the air and coal of the character described were passed through the bottom port and the top and middle ports completely blocked off, the coal was fed at a rate of 480 lbs. per hr. with 20.69% excess air. The total supply of air at 5550 lbs. per hour was supplied to the bottom port at a velocity therethrough of 10,000 ft. per minute, and a temperature of 376° F. The furnace temperature by optical pyrometer was 2855° F., and the heat release rate 226,800 B. t. u. per cu. ft. per furnace volume. The slag flowed freely to the secondary furnace chamber and operating conditions were good. The fly ash amounted to 1.2% of the fuel with a carbon content of 0.75%.

In the modifications illustrated in Figs. 10–17, the point of admission of the fuel and combustion air supplied can be varied relative to the furnace chamber height as desired, thus permitting regulation of the length of travel of the entering fuel and air in the furnace chamber in accordance with changes in fuel rating, or any other varying operating condition.

In the modification illustrated in Figs. 10–13, the points of entry of the fuel and air into the furnace chamber are simultaneously controlled with the same relative positions of the entering fuel and air streams maintained throughout the range of adjustment. For this purpose the air duct nozzle section 66 has a vertically inclined open ended stationary tube 120 mounted thereon and within which is concentrically positioned a stationary fuel pipe 121 connected at its upper end to the fuel supply pipe 10. The pipes 120, 121 have an annular space therebetween throughout their length and terminate at a flanged opening 122 in the top of the duct section 66. The annular space described is for the reception of a telescoping continuation of the fuel pipe 121 consisting of an open ended pipe 123 surrounding the pipe 121 and provided with a pair of lateral guide wings 124 which fit into vertically inclined guide slots 125 in opposite sides of the duct section 66. The tube 120 is also formed with similar guide slots 126 which are continuations of the slots 125. The pipe 123 has a pair of adjusting rods 127 on its wings 124 which extend upwardly in the slots 126 and are held in any desired vertical position relative to the tube 120 by a combined sleeve and set screw 128. The direction of air travel in the duct section 66 is indicated by the arrows in Figs. 10 and 13, and the pipe 123 is so inclined that its lower end leads its upper end relative to the direction of air travel.

The lower end of the pipe 123 has a reduced extension 129 for receiving various types of fuel tips. The tip 130 illustrated has been found particularly effective in operation in securing a distribution of the descending fuel particles over a substantial part of the height of the duct section 66 and consists of a sleeve 131 fitting over the pipe extension 129 and a downwardly tapering tongue 132 formed by cutting away all but a narrow sector of the sleeve wall at the outer side thereof.

With the construction described, the stream of fuel particles flow down through the pipes 10 and 121 into the pipe 123. The amount of fuel supplied is normally not sufficient to fill the entire cross-section of these pipes and the fuel stream tends to concentrate along the side of the pipe 123 facing the incoming high velocity air stream. The descending fuel stream tends to continue down along the concave face of the tongue 132 subject to the action of the air stream sweeping around the sides of and below the tongue. The pipe 123 and attached wings 124 act as a damper for the air duct section 66, concentrating the air flow therethrough to the portion of the duct below the wing level. The pipe 123 is shown in its lowermost position, which would normally be used for the lowest rating for which the furnace is designed. As the pipe 123 is raised, such as for higher fuel ratings, a greater percentage of the air will pass below the tongue 123. As compared to the portion of the air stream passing around and immediately below the tongue and acting as primary air, the remaining portion of the air stream will be relatively clear and of the nature of secondary air.

While the fuel burner construction illustrated in Figs. 10-13 is adapted for use in various types of furnaces, it is particularly adapted for use with a cyclone furnace construction and arranged as illustrated in Figs. 1-5. In one 24-hour test run of a cyclone furnace with such a fuel burner assembly, the fuel burned was Kincaid coal having the following proximate analysis:

|  | Percent |
|---|---|
| Volatile matter | 39.7 |
| Fixed carbon | 43.2 |
| Ash | 17.1 |
| Moisture (as fired) | 11.4 |

Heat content (as fired) 10,300 B. t. u. per pound

The fuel was reduced to the following sizing:

100% through No. 4-mesh screen
81.2% through No. 10-mesh screen
37.2% through No. 30-mesh screen
21.2% through No. 50-mesh screen
10.9% through No. 100-mesh screen
5.7% through No. 200-mesh screen The ash as analyzed showed an initial deformation temperature of 1990° F., a softening temperature of 2060° F., and a fluid temperature of 2200° F. The coal was fired at the rate of 2448 lbs./hr. using 6.3% excess air. The air velocity through the burner was 18,300 ft./min., and through the throat 22,100 ft./min., the air temperature at the furnace inlet being 442° F. The ash recovered through the slag holes in the secondary furnace chamber and tunnel amounted to 95.3% of the recoverable ash in the coal. The flue gas analyses averaged 17.31% $CO_2$, 1.28% $O_2$, and 0% CO. Operating conditions during and at the end of the test run were good, and the only accumulation in the furnace chamber was a thin layer of slag on the furnace walls.

In the modified burner assembly illustrated in Figs. 14–17, the point of entry of the fuel stream into the duct section 66, and consequently the furnace chamber, and the effective height of the air stream in the duct are separately variable. In this arrangement the fuel pipe 10 has a vertical extension 140 positioned in a rectangular casing 141, mounted alongside and extending above the air duct section 66. A movable burner pipe 142 is also positioned in the lower part of the casing 141 in telescoping relation with the lower end of the pipe 140. The lower end of the pipe 142 extends downwardly and laterally, as indicated at 143, and carries a vertical guide plate 144 around its discharge end. The guide plate 144 is positioned in vertical slots 145 in the side of the duct 66. The fuel pipe 142 can be raised and lowered relative to the duct 66 by the hand wheel 147 operating through a pinion gear 148 and a rack 149 on the side of the pipe. With this arrangement the position of the fuel pipe can be vertically adjusted in the casing 141 to vary the position of its discharge end 143 relative to the duct section 66, through which a stream of high velocity air is passed in the direction indicated by the arrow in Fig. 17. The effective height of the air stream in the duct section 66 is controlled by a vertical damper 150 mounted in guide slots in the sides of the duct section 66 immediately in advance of the point of fuel entry. The position of the damper is vertically adjusted by means of a rod 151 on its upper end. The damper and rod are held in any desired position by a sleeve 153 mounted on the rod at the upper end of a vertical extension 154 of the damped guide slots, and a set screw 155.

With this arrangement the discharge end of the fuel pipe 143 is adjusted to the proper position for the corresponding fuel rating, and the damper 150 is correspondingly adjusted so that it is normally in a position with its lower end terminating slightly above the upper end of the fuel outlet, as indicated in Fig. 14. The stream of high velocity air sweeping through the duct 66 below the damper 150 picks up the fuel particles discharged through the lower end of the fuel pipe and discharges them into the furnace chamber. As in the burner assembly illustrated in Figs. 10–13, the upper portion of the air stream will act as primary air, while the lower portion will be in effect secondary air.

This application is a division of our prior application, Serial No. 382,264, filed March 7, 1941, now U. S. Patent No. 2,357,303.

We claim:

1. Apparatus for burning a reduced solid fuel comprising a furnace structure having a vertically elongated fuel inlet port, a vertically elongated air duct connected to said fuel inlet port, fuel discharge means arranged to discharge a reduced solid fuel into said air duct in contact with the air stream therein comprising a vertically movable fuel pipe extending the full width of said air duct, and means for varying the position of the discharge end of said fuel discharge pipe in said air duct and simultaneously regulating the height of said air stream adjacent the point of fuel entry to said air duct.

2. Apparatus for burning a reduced solid fuel comprising a furnace structure having a vertically elongated fuel inlet port, a vertically elongated air duct connected to said fuel inlet port, fuel discharge means arranged to discharge a reduced solid fuel into said air duct in contact with the air stream therein comprising an opening in one side of said air duct, a vertically slidable plate in said opening having an adjustable fuel pipe discharging therethrough, means for varying the position of said plate and the discharge end of said fuel pipe relative to said air duct, a vertically slidable damper in said air duct adjacent the point of fuel entry thereto, and means for adjusting said damper to regulate the height of said air stream adjacent the point of fuel entry.

3. Apparatus for burning a solid fuel comprising a furnace structure having a fuel inlet port, an air duct connected to said fuel inlet port, fuel discharge means arranged to discharge a solid fuel in a reduced condition into said air duct in contact with the air stream therein and adjacent said inlet port, and means for changing the effective fuel and air discharge area of said inlet port including means for varying the position of the discharge end of said fuel discharge means in said air duct and simultaneously regulating the effective flow area of said air stream adjacent the point of fuel entry to said air duct.

4. Apparatus for burning a reduced solid fuel comprising a furnace structure having a vertically elongated fuel inlet port, a vertically elongated air duct connected to said fuel inlet port, fuel discharge means arranged to discharge a reduced solid fuel into said air duct in contact with the air stream therein comprising a vertically movable fuel pipe in said air duct having a tongue extension at its lower end of smaller width than said air duct, and means for varying the position of said tongue extension in said air duct.

5. Apparatus for burning a reduced solid fuel comprising a furnace structure having a vertically elongated fuel inlet port, a vertically elongated air duct connected to said fuel inlet port, fuel discharge means arranged to discharge a reduced solid fuel into said air duct in contact with the air stream therein comprising a vertically movable fuel pipe extending the full width of said air duct, and a downwardly tapered tongue of segmental transverse cross-section on the lower end of said fuel pipe and having a width less than the width of said air duct to permit air to sweep by the sides thereof.

6. Apparatus for burning a reduced solid fuel comprising a furnace structure having a vertically elongated fuel inlet port, a vertically elongated air duct connected to said fuel inlet port, fuel discharge means arranged to discharge a reduced solid fuel into said air duct in contact with the air stream therein comprising a vertically movable fuel pipe in said air duct, guide wings on said fuel pipe arranged to close the corresponding portion of said air duct, and means for varying the position of the discharge end of said fuel pipe in said air duct and simultaneously varying the position of said guide wings to regulate the height of said air stream adjacent the point of fuel entry to said air duct.

7. Apparatus for burning solid fuel comprising a furnace structure having a vertically elongated fuel inlet port, a vertically elongated air duct connected to said fuel inlet port, fuel discharge means arranged to discharge a solid fuel in a reduced condition into said air duct in contact with the air stream therein comprising an opening in one side of said air duct, a vertically slidable plate in said opening having an adjustable fuel pipe discharging therethrough, and means for varying the position of said plate and the discharge end of said fuel pipe relative to said air duct.

8. Apparatus for burning solid fuel comprising a furnace structure having a fuel inlet port, an air duct connected to said fuel inlet port, fuel discharge means arranged to discharge a solid fuel in a reduced condition into said air duct in contact with the air stream therein comprising an opening in one side of said air duct, a slidable plate in said opening having an adjustable fuel pipe discharging therethrough, means for varying the position of said plate and the discharge end of said fuel pipe relative to said air duct, a slidable damper in said air duct adjacent the point of fuel entry thereto, and means for adjusting said damper to regulate the effective flow area of said air stream adjacent the point of fuel entry.

9. Apparatus for burning a reduced solid fuel comprising a furnace structure having a transversely elongated fuel and air inlet port, a correspondingly elongated air duct having its discharge end registering with said fuel inlet port, fuel discharge means arranged to discharge a reduced solid fuel into said air duct in contact with the air stream therein, means for varying the position of the discharge end of said fuel discharge means in the direction of elongation of said air duct to vary the location of fuel entry into said air duct relative to the cross-sectional area thereof, and means for regulating the effective cross-sectional flow area of said air stream adjacent to the location of fuel entry into said air duct.

10. Apparatus for burning a reduced solid fuel comprising means forming a furnace chamber of substantially circular cross-sectional area, an air duct having a tangential connection into said furnace chamber adjacent one end thereof, said air duct having a cross-sectional shape elongated axially of said furnace chamber, fuel discharge conduit means opening to said air duct closely adjacent to said furnace chamber and arranged to discharge a reduced solid fuel into said air duct in contact with the air stream therein, means for varying the effective position of the discharge end of said fuel discharge conduit means relative to the cross-sectional area of said air duct in the direction of cross-sectional elongation thereof, and means for regulating the effective cross-sectional flow area of said air stream adjacent to the location of fuel entry into said air duct.

11. Apparatus for burning a reduced solid fuel comprising means forming a vertically arranged furnace chamber of substantially circular horizontal cross-sectional area, an air duct of vertically elongated cross-sectional shape having a tangential connection into said furnace chamber adjacent the upper end thereof, means for supplying air under a superatmospheric pressure to said air duct, fuel discharge conduit means opening to said air duct closely adjacent to said furnace chamber and arranged to gravitationally discharge a reduced solid fuel into said air duct in position to be swept up by the air stream therein, and means for varying the effective position of the discharge end of said fuel discharge conduit means relative to the vertical dimension of said air duct, whereby to vary the length of fuel travel axially of said furnace chamber while maintaining a uniform direction of fuel entry into said furnace chamber.

12. Apparatus for burning a reduced solid fuel comprising means forming a furnace chamber of substantially circular cross-sectional area about a substantially vertical axis and having a vertically elongated fuel and air inlet port opening tangentially into said chamber adjacent the upper end thereof, a vertically elongated air duct having its discharge end registering with said inlet port and directed tangentially of said chamber, fuel discharge means having an opening to said air duct closely adjacent to said furnace chamber, said opening being of relatively small area in comparison with the flow area of said duct and of less height than said duct and arranged to discharge a reduced solid fuel into said air duct in contact with the air stream therein at a location intermediate the height of said duct, a vertically slidable damper in said air duct closely adjacent to the point of fuel entry thereto, at the upstream side of said point, and means for adjusting said damper to regulate the effective height of said air stream adjacent to said point of fuel entry.

13. Apparatus for burning a reduced solid fuel comprising means forming a furnace chamber of substantially circular cross-sectional area about a substantially vertical axis and having a vertically elongated fuel and air inlet port opening tangentially into said chamber adjacent the upper end thereof, a vertically elongated air duct having its discharge end registering with said inlet port and directed tangentially of said chamber, fuel discharge means having an opening to said air duct closely adjacent to said furnace chamber, said opening being of relatively small area in comparison with the flow area of said duct and of less height than said duct and arranged to gravitationally discharge a reduced solid fuel into said air duct in position to be swept up by the air stream therein at a location intermediate the height of said duct and adjacent the radially outer tangential boundary thereof, a vertically slidable damper in said air duct closely adjacent to the point of fuel entry thereto, at the upstream side of said point, and means for adjusting said damper to regulate the effective height of said air stream adjacent to said point of fuel entry relative to the lower end of said port.

HOWARD J. KERR.
JAMES FLETCHER.
GEORGE A. WATTS.
LAMBERT KOOISTRA.

REFERENCES CITED

The following references are of record in the file of this patent:

UNITED STATES PATENTS

| Number | Name | Date |
|---|---|---|
| 739,957 | Walker | Sept. 29, 1903 |
| 824,728 | Larsen | July 3, 1906 |
| 930,127 | Bassler | Aug. 3, 1909 |
| 987,834 | Selden | Mar. 28, 1911 |
| 1,306,235 | Schutz | June 10, 1919 |
| 1,421,898 | Bergman | July 4, 1922 |
| 1,454,979 | Muhlfeld, et al. | May 15, 1923 |
| 1,591,679 | Hawley | July 6, 1926 |
| 1,618,808 | Burg | Feb. 22, 1927 |
| 1,657,698 | Schutz | Jan. 31, 1928 |
| 1,838,667 | Frisch, et al. | Dec. 29, 1931 |
| 2,242,787 | Lieberherr | May 20, 1941 |
| 2,357,303 | Kerr, et al. | Sept. 5, 1944 |

FOREIGN PATENTS

| Number | Country | Date |
|---|---|---|
| 297,835 | France | Sept. 25, 1928 |